(12) United States Patent
Yablonsky et al.

(10) Patent No.: US 9,968,883 B2
(45) Date of Patent: May 15, 2018

(54) SYSTEMS AND METHODS FOR ACID GAS REMOVAL FROM A GASEOUS STREAM

(71) Applicant: Skyonic Corporation, Austin, TX (US)

(72) Inventors: Al Yablonsky, Austin, TX (US);
Alexander Stola, Austin, TX (US);
Adam Germain, Austin, TX (US); Joe Jones, Austin, TX (US)

(73) Assignee: CARBONFREE CHEMICALS HOLDINGS, LLC, White Plains, NY (US)

( * ) Notice: Subject to any disclaimer, the term of this patent is extended or adjusted under 35 U.S.C. 154(b) by 310 days.

(21) Appl. No.: 14/599,137

(22) Filed: Jan. 16, 2015

(65) Prior Publication Data
US 2015/0202568 A1    Jul. 23, 2015

Related U.S. Application Data

(60) Provisional application No. 61/928,965, filed on Jan. 17, 2014.

(51) Int. Cl.
*B01D 47/00* (2006.01)
*B01D 53/78* (2006.01)
(Continued)

(52) U.S. Cl.
CPC .......... *B01D 53/78* (2013.01); *B01D 53/502* (2013.01); *B01D 53/526* (2013.01); *B01D 53/56* (2013.01);
(Continued)

(58) Field of Classification Search
CPC . F02C 7/05; A61L 9/145; B01D 46/00; B05B 17/00
(Continued)

(56) References Cited

U.S. PATENT DOCUMENTS

| | | | |
|---|---|---|---|
| 1,918,153 A | 7/1933 | Wagner | 423/233 |
| 2,357,130 A | 8/1944 | Pike | 423/163 |

(Continued)

FOREIGN PATENT DOCUMENTS

| | | |
|---|---|---|
| CA | 1129628 | 8/1982 |
| CA | 2 581 157 | 3/2006 |

(Continued)

OTHER PUBLICATIONS

Chen et al., "Absorption of $H_2S$ in NaOCl caustic aqueous solution", *Environ Prog*, 20: 175-181, 2001. (abstract provided).
(Continued)

*Primary Examiner* — Monzer R Chorbaji
(74) *Attorney, Agent, or Firm* — Norton Rose Fulbright US LLP

(57) ABSTRACT

Apparatuses, systems, and methods for removing acid gases from a gas stream are provided. Gas streams include waste gas streams or natural gas streams. The methods include obtaining a hypochlorite and a carbonate or bicarbonate in an aqueous mixture, and mixing the aqueous mixture with the gas stream to produce sulfates or nitrates from sulfur-based and nitrogen-based acidic gases. Some embodiments of the present disclosure are directed to produce the carbonate and/or bicarbonate scrubbing reagent from $CO_2$ in the gas stream. Still others are disclosed.

15 Claims, 6 Drawing Sheets

(51) Int. Cl.

| | | |
|---|---|---|
| *B01D 53/50* | (2006.01) | |
| *B01D 53/52* | (2006.01) | |
| *B01D 53/56* | (2006.01) | |
| *B01D 53/62* | (2006.01) | |
| *C01B 11/06* | (2006.01) | |
| *C01D 7/07* | (2006.01) | |
| *C01D 7/10* | (2006.01) | |
| *B01D 53/60* | (2006.01) | |
| *C25B 15/08* | (2006.01) | |
| *C25B 1/34* | (2006.01) | |
| *B01D 53/75* | (2006.01) | |

(52) U.S. Cl.
CPC ............ *B01D 53/60* (2013.01); *B01D 53/62* (2013.01); *C01B 11/062* (2013.01); *C01D 7/07* (2013.01); *C01D 7/10* (2013.01); *C25B 1/34* (2013.01); *C25B 15/08* (2013.01); *B01D 53/75* (2013.01); *B01D 2251/108* (2013.01); *B01D 2251/304* (2013.01); *B01D 2251/60* (2013.01); *B01D 2251/604* (2013.01); *B01D 2251/606* (2013.01); *B01D 2256/24* (2013.01); *B01D 2257/2045* (2013.01); *B01D 2257/2047* (2013.01); *B01D 2257/304* (2013.01); *B01D 2257/504* (2013.01); *B01D 2258/0283* (2013.01); *Y02C 10/04* (2013.01); *Y02P 20/152* (2015.11)

(58) Field of Classification Search
USPC .................. 422/4, 5; 96/275; 261/75
See application file for complete search history.

(56) References Cited

U.S. PATENT DOCUMENTS

| | | | |
|---|---|---|---|
| 2,383,674 A | 8/1945 | Osborne ..................... 422/423 |
| 3,801,698 A | 4/1974 | Lowrance et al. ............ 423/234 |
| 3,855,398 A | 12/1974 | Hoffman et al. ............. 423/422 |
| 3,864,236 A | 2/1975 | Lindstrom et al. .......... 204/265 |
| 3,934,012 A | 1/1976 | Schievelbein ................ 423/232 |
| 4,032,616 A | 6/1977 | Artur et al. .................. 423/190 |
| 4,069,117 A | 1/1978 | Cooper ....................... 423/220 |
| 4,128,701 A | 12/1978 | Maricle ........................... 429/21 |
| 4,147,599 A | 4/1979 | O'Leary et al. ............... 204/187 |
| 4,496,452 A | 1/1985 | Bianchi ........................ 204/266 |
| 4,620,969 A | 11/1986 | Wilkinson ................... 423/421 |
| 4,720,375 A | 1/1988 | Ainscow et al. ............. 423/175 |
| 4,749,453 A | 6/1988 | Harris ............................. 204/98 |
| 4,764,286 A | 8/1988 | Bon et al. ..................... 210/757 |
| 5,080,799 A | 1/1992 | Yan .............................. 210/661 |
| 5,888,256 A | 3/1999 | Morrison ........................ 44/552 |
| 6,340,736 B1 | 1/2002 | Coenen et al. ............... 528/196 |
| 6,488,740 B1 | 12/2002 | Patel et al. ....................... 95/171 |
| 6,592,829 B2 | 7/2003 | Chakravarti et al. ......... 422/171 |
| 6,676,824 B2 | 1/2004 | Urquhart et al. ............. 205/504 |
| 6,846,584 B2 | 1/2005 | Dutil et al. ...................... 429/19 |
| 6,890,497 B2 | 5/2005 | Rau et al. ..................... 423/220 |
| 6,896,865 B2 | 5/2005 | Kumoi et al. ................ 423/488 |
| 6,908,570 B2 | 6/2005 | Green ...................... 252/182.32 |
| 6,958,136 B2 | 10/2005 | Chandran et al. ......... 423/239.1 |
| 7,361,279 B2 | 4/2008 | Hernandez et al. .......... 210/668 |
| 7,427,449 B2 | 9/2008 | Delaney et al. ................ 429/19 |
| 7,517,435 B2 | 4/2009 | Guth et al. ...................... 203/47 |
| 7,527,770 B2 | 5/2009 | Monzyk et al. ........... 422/186.3 |
| 7,655,069 B2 | 2/2010 | Wright et al. .................... 95/92 |
| 7,655,193 B1 | 2/2010 | Rau et al. ..................... 422/169 |
| 7,699,909 B2 | 4/2010 | Lackner et al. ................. 95/236 |
| 7,708,806 B2 | 5/2010 | Wright et al. .................. 95/139 |
| 7,713,399 B2* | 5/2010 | Martinie .............. B01D 53/965 205/343 |
| 7,727,374 B2 | 6/2010 | Jones ........................... 205/508 |
| 7,735,274 B2 | 6/2010 | Constantz et al. ............ 106/735 |
| 7,744,761 B2 | 6/2010 | Constantz et al. ............ 210/652 |
| 7,749,476 B2 | 7/2010 | Constantz et al. ............ 106/668 |
| 7,754,169 B2 | 7/2010 | Constantz et al. ............ 106/465 |
| 7,833,328 B2 | 11/2010 | Lackner et al. ................. 96/281 |
| 7,842,126 B1 | 11/2010 | Dilmore et al. .................. 95/91 |
| 7,875,163 B2 | 1/2011 | Gilliam et al. ............... 205/210 |
| 7,887,694 B2 | 2/2011 | Constantz et al. ............ 423/230 |
| 7,909,911 B2 | 3/2011 | Lackner et al. ................. 95/51 |
| 7,914,685 B2 | 3/2011 | Constantz et al. ............ 404/44 |
| 7,919,064 B2 | 4/2011 | Kawatra et al. .............. 423/232 |
| 7,931,809 B2 | 4/2011 | Constantz et al. ............ 210/652 |
| 7,993,432 B2 | 8/2011 | Wright et al. .................. 95/139 |
| 7,993,500 B2 | 8/2011 | Gilliam et al. ............... 204/263 |
| 8,062,418 B2 | 11/2011 | Constantz et al. ............ 106/738 |
| 8,105,558 B2 | 1/2012 | Comrie ........................ 423/210 |
| 8,114,214 B2 | 2/2012 | Constantz et al. ............ 106/738 |
| 8,114,374 B2 | 2/2012 | Blencoe et al. .............. 423/432 |
| 8,137,444 B2 | 3/2012 | Farsad et al. ................... 96/235 |
| 8,137,455 B1 | 3/2012 | Constantz et al. ............ 106/738 |
| 8,177,909 B2 | 5/2012 | Constantz et al. ............ 106/738 |
| 8,202,659 B2 | 6/2012 | Coustry et al. ............... 423/421 |
| 8,470,281 B2 | 6/2013 | Bang et al. ................... 423/431 |
| 8,535,630 B2 | 9/2013 | Wen et al. .................... 423/220 |
| 8,673,256 B2 | 3/2014 | Blencoe et al. ............. 423/419.1 |
| 8,741,244 B2 | 6/2014 | Jones ............................ 423/220 |
| 8,795,508 B2 | 8/2014 | Jones ............................ 205/510 |
| 8,883,104 B2 | 11/2014 | Seeker et al. ................. 423/220 |
| 9,205,375 B2 | 12/2015 | Jones et al. | |
| 2002/0129450 A1 | 9/2002 | Kim ................................ 8/115 |
| 2004/0051080 A1 | 3/2004 | Ernst et al. .................... 423/438 |
| 2004/0089841 A1 | 5/2004 | Green ...................... 252/182.32 |
| 2004/0096384 A1 | 5/2004 | Echigo et al. ................ 423/247 |
| 2004/0178149 A1 | 9/2004 | Hernandez et al. .......... 210/688 |
| 2004/0213705 A1 | 10/2004 | Blencoe et al. .............. 422/129 |
| 2004/0219090 A1 | 11/2004 | Dziedzic et al. ........... 423/437.1 |
| 2004/0265202 A1 | 12/2004 | Chandran et al. ........... 423/239.1 |
| 2005/0002847 A1 | 1/2005 | Maroto-Valer et al. ...... 423/432 |
| 2005/0011770 A1 | 1/2005 | Katsuyoshi et al. .......... 205/742 |
| 2005/0013750 A1 | 1/2005 | Monzyk et al. ............ 422/186.3 |
| 2005/0031522 A1 | 2/2005 | Delaney et al. ................ 423/19 |
| 2005/0132883 A1* | 6/2005 | Su ..................... B01D 53/1425 95/235 |
| 2005/0214187 A1 | 9/2005 | Johnson ..................... 423/239.1 |
| 2006/0051274 A1 | 3/2006 | Wright et al. ................ 423/220 |
| 2006/0076228 A1 | 4/2006 | Guth et al. ...................... 203/47 |
| 2006/0185985 A1 | 8/2006 | Jones ........................... 205/508 |
| 2006/0186562 A1 | 8/2006 | Wright et al. .................. 261/94 |
| 2006/0289003 A1 | 12/2006 | Lackner et al. ............. 128/200.4 |
| 2007/0187247 A1 | 8/2007 | Lackner et al. .............. 204/518 |
| 2008/0031801 A1 | 2/2008 | Lackner et al. .............. 423/438 |
| 2008/0087165 A1 | 4/2008 | Wright et al. .................... 95/51 |
| 2008/0138265 A1 | 6/2008 | Lackner et al. .............. 423/224 |
| 2008/0245660 A1 | 10/2008 | Little et al. ................... 204/242 |
| 2008/0245672 A1 | 10/2008 | Little et al. ................... 205/555 |
| 2008/0248350 A1 | 10/2008 | Little et al. ..................... 429/21 |
| 2009/0001020 A1 | 1/2009 | Constantz et al. ............ 210/652 |
| 2009/0010827 A1 | 1/2009 | Geerlings et al. ............ 423/164 |
| 2009/0020044 A1 | 1/2009 | Constantz et al. ............ 106/738 |
| 2009/0074656 A1 | 3/2009 | Billings ...................... 423/648.1 |
| 2009/0081096 A1 | 3/2009 | Pellegrin ...................... 423/232 |
| 2009/0101008 A1 | 4/2009 | Lackner et al. .............. 423/224 |
| 2009/0101050 A1 | 4/2009 | Lackner et al. .............. 110/216 |
| 2009/0120288 A1 | 5/2009 | Lackner et al. ................. 95/68 |
| 2009/0127127 A1 | 5/2009 | Jones ........................... 205/464 |
| 2009/0169452 A1 | 7/2009 | Constantz et al. ............ 423/230 |
| 2009/0202413 A1 | 8/2009 | Saxena ......................... 423/277 |
| 2009/0232861 A1 | 9/2009 | Wright et al. ................ 424/405 |
| 2009/0294366 A1 | 12/2009 | Wright et al. ................ 210/683 |
| 2009/0301352 A1 | 12/2009 | Constantz et al. ............ 106/688 |
| 2009/0320688 A1 | 12/2009 | Lackner et al. ................. 96/257 |
| 2010/0051859 A1 | 3/2010 | House et al. ............. 252/182.32 |
| 2010/0092368 A1 | 4/2010 | Neumann et al. .......... 423/437.1 |
| 2010/0095842 A1 | 4/2010 | Lackner et al. ................ 95/107 |
| 2010/0105126 A1 | 4/2010 | Wright et al. ............... 435/257.1 |
| 2010/0116137 A1 | 5/2010 | Wright et al. .................. 95/150 |
| 2010/0155258 A1 | 6/2010 | Kirk et al. .................... 205/351 |
| 2010/0202937 A1 | 8/2010 | Lackner et al. .............. 422/187 |
| 2010/0260653 A1 | 10/2010 | Jones ........................... 423/220 |
| 2011/0027142 A1 | 2/2011 | Wright et al. ................ 422/187 |
| 2011/0027143 A1 | 2/2011 | Wright et al. ................ 422/187 |

(56) References Cited

U.S. PATENT DOCUMENTS

| | | | |
|---|---|---|---|
| 2011/0027157 A1 | 2/2011 | Wright et al. | 423/230 |
| 2011/0033357 A1 | 2/2011 | Wright et al. | 423/230 |
| 2011/0033358 A1 | 2/2011 | Wright et al. | 423/230 |
| 2011/0036728 A1 | 2/2011 | Farsad et al. | 205/770 |
| 2011/0056382 A1 | 3/2011 | Lackner et al. | 96/329 |
| 2011/0079144 A1 | 4/2011 | Wright et al. | 95/54 |
| 2011/0079146 A1 | 4/2011 | Wright et al. | 95/92 |
| 2011/0079147 A1 | 4/2011 | Wright et al. | 95/92 |
| 2011/0079149 A1 | 4/2011 | Wright et al. | 96/143 |
| 2011/0079150 A1 | 4/2011 | Wright et al. | 96/143 |
| 2011/0081709 A1 | 4/2011 | Wright et al. | 435/257.1 |
| 2011/0081710 A1 | 4/2011 | Wright et al. | 435/257.1 |
| 2011/0081712 A1 | 4/2011 | Wright et al. | 435/296.1 |
| 2011/0083554 A1 | 4/2011 | Wright et al. | 95/92 |
| 2011/0091955 A1 | 4/2011 | Constantz et al. | 435/168 |
| 2011/0135551 A1 | 6/2011 | House et al. | 423/234 |
| 2011/0182779 A1 | 7/2011 | Kawatra et al. | 422/168 |
| 2011/0203939 A1 | 8/2011 | Jones | 205/510 |
| 2011/0243822 A1 | 10/2011 | Mortson | 423/232 |
| 2013/0192783 A1 | 8/2013 | Devenney et al. | 423/220 |
| 2013/0202516 A1 | 8/2013 | Jones et al. | 423/431 |
| 2014/0147351 A1 | 5/2014 | Kang et al. | 422/630 |
| 2014/0147371 A1 | 5/2014 | Blencoe et al. | 423/419.1 |
| 2014/0234946 A1 | 8/2014 | Constantz et al. | 95/236 |
| 2014/0322803 A1 | 10/2014 | Constantz et al. | 435/289.1 |
| 2014/0328743 A1 | 11/2014 | Jones | 423/220 |

FOREIGN PATENT DOCUMENTS

| | | |
|---|---|---|
| DE | 19631794 | 8/1997 |
| EP | 2070578 | 6/2009 |
| GB | 1536767 | 4/1979 |
| GB | 2460910 | 6/2010 |
| GE | 1999-1612 | 4/1999 |
| GE | 2001-2514 | 8/2001 |
| GE | 2004-3357 | 10/2004 |
| JP | 51-023499 | 2/1976 |
| JP | 52-084194 | 7/1977 |
| JP | 52085997 | 7/1977 |
| JP | 61-048587 | 3/1986 |
| JP | 8-503884 | 4/1996 |
| JP | 10-001307 | 1/1998 |
| JP | 10-57745 | 3/1998 |
| JP | 2002-293537 | 10/2002 |
| JP | 2004174369 | 6/2004 |
| JP | 2004-352587 | 12/2004 |
| KR | 1985-0001577 | 10/1985 |
| RU | 2 019 271 | 9/1994 |
| RU | 2 031 695 | 3/1995 |
| RU | 2054959 | 2/1996 |
| RU | 2199374 | 2/2003 |
| RU | 2233898 | 8/2004 |
| RU | 2334547 | 8/2005 |
| WO | WO 99/64137 | 12/1999 |
| WO | 2004/037391 | 5/2004 |
| WO | 2004/098740 | 11/2004 |
| WO | 2005/108291 | 11/2005 |
| WO | 2005/108297 | 11/2005 |
| WO | 2006/009600 | 1/2006 |
| WO | 2006/023743 | 3/2006 |
| WO | 2006/034339 | 3/2006 |
| WO | 2006/036396 | 4/2006 |
| WO | 2006/084008 | 8/2006 |
| WO | 2006/113673 | 10/2006 |
| WO | 2006/113997 | 11/2006 |
| WO | 2007/016271 | 2/2007 |
| WO | 2007/018558 | 2/2007 |
| WO | 2007/003013 | 11/2007 |
| WO | 2008/018928 | 2/2008 |
| WO | 2008/042919 | 4/2008 |
| WO | 2008/061210 | 5/2008 |
| WO | 2008/124538 | 10/2008 |
| WO | 2008/131132 | 10/2008 |
| WO | 2009/039445 | 3/2009 |
| WO | 2009/061836 | 5/2009 |
| WO | 2009/086460 | 7/2009 |
| WO | 2009/102816 | 8/2009 |
| WO | 2009/105566 | 8/2009 |
| WO | 2009/146436 | 12/2009 |
| WO | 2009/149292 | 12/2009 |
| WO | 2010/019600 | 2/2010 |
| WO | 2010/022399 | 2/2010 |
| WO | 2010/132395 | 11/2010 |
| WO | 2011/011740 | 1/2011 |
| WO | 2011/075680 | 6/2011 |

OTHER PUBLICATIONS

Air and Gas Duct Structural Design Committee of the Energy Division of the Air and Gas Structural Design Committee. *The Structural Design of Air and Gas Ducts for Power Stations and Industrial Boiler Applications*. Ronald L. Schneider, chmn. New York, NY: ASCE Publications, Aug. 1, 1995. pp. 11-15.

Cadmium Chloride, Material Safety Data Sheet, CAS No. 7790-78-5, ESPI Metals, available on the internet at http://www.espimetals.com/index.php/msds/460-cadmium-chloride. Revised/Verified Sep. 2005. Accessed Dec. 28, 2011.

Calcium Nitrate Tetrahydrate, Material Safety Data Sheet, CAS No. 13477-34-4, available on the internet at http://avogadro.chem.iastate.edu/MSDS/Ca%28NO3%292-4H2O.htm. MSDS Creation Date: Jan. 21, 1998. Revision #4 Date: Oct. 3, 2005. Accessed Dec. 28, 2011.

Cobalt Iodide, Material Safety Data Sheet, CAS No. 45238-00-3, ESPI Metals, available on the internet at http://www.espimetals.com/index.php/msds/527-cobalt-iodide. Revised/Verified Dec. 2004. Accessed Dec. 28, 2011.

Cobalt(II) Sulfate Heptahydrate, Material Safety Data Sheet, CAS No. 10026-24-I, Chemical Book, available on the internet at http://www.chemicalbook.com/ProductMSDSDetailCB0323842_EN.htm. Copyright 2008. Accessed Dec. 28, 2011.

Daval. D. et al. "Carbonation of Ca-bearing Silicates, The Case of Wollastonite: Experimental Investigations and Kinetic Modeling," Chemical Geology, vol. 265, No. 1-2, pp. 63-78; Jul. 15, 2009.

Eloneva, S., "Reduction of CO2 Emissions by Mineral Carbonation: Steelmaking Slags as Raw Material with a Pure Calcium Carbonate End Product," PhD Thesis, Aalto University School of Science and Technology, Espoo Finaland, (online URL) http://lib.tkk.fi/Diss/2010/isbn9789526034577/isbn978526034577.pdf. pp. 31-33 (2010).

Goldberg et al., "CO2 mineral sequestration studies in US," *Proceedings of First National Conference on Carbon Sequestration*, May 14-17, 2001, Washington, DC., section 6c, United States Department of Energy, National Energy Technology Laboratory. available at: http://www.netl.doe.gov/publications/proceedings/01/carbon_seq/6c1.pdf.

Haywood, et al., "Carbon Dioxide Sequestration as Stable Carbonate Minerals—Environmental Barriers." Environmental Geology 41:11-16 (2001).

Kelley, "Energy requirements and equilibria in the dehydration, hydrolysis, and decomposition of magnesium chloride", Technical Paper 676, United States Government Printing Office, pp. 1-26, 1945.

Kirk-Othmer Encyclopedia of Chemical Technology, $4^{th}$ ed. vol. 15 p. 343, 1998, New York: John Wiley and Sons.

Kirsh et al., "Kinetic analysis of thermal dehydration and hydrolysis of MgCl12.6H2O by DTA and TG," *Journal of Thermal Analysis*, 32:393-408, 1987.

Lackner el al., "Magnesite disposal of carbon dioxide," submitted to $22^{nd}$ International Technical Conference on Coal Utilization and Fuel System, Clearwater, Florida, Mar. 16-19, 1997.

Li, et al. "Electrolysis and heat pretreatment methods to promote CO2 Sequestration by Mineral Carbonation." Chemical Engineering Research and Design. pp. 210-215, 2009.

Lithium Bromide, Material Safety Data Sheet, CAS No. 7550-35-8, ChemCas, available on the internet at http://www.chemcas.com/material/cas/archive/7550-35-8_v1.asp. Material Safety Data Sheet Creation Date: Jun. 29, 1999. Revision #3 Date: Mar. 18, 2003. Accessed Dec. 28, 2011.

(56) References Cited

OTHER PUBLICATIONS

Magnesium Nitrate Hexahydrate, Material Safety Data Sheet, CAS No. 13446-18-9, available on the internet at http://avogadro.chem.iastate.edu/MSDS/MgNO3-6H2O.htm. Material Safety Data Sheet Creation Date: Sep. 2, 1997. Revision #6 Date: Aug. 11, 2004. Accessed Dec. 28, 2011.

Manganese (II) Chloride Tetrahydrate, Material Safety Data Sheet, CAS No. 13446-34-9, available on the internet at http://avogadro.chem.iastate.edu/MSDS/MnC12.htm. Material Safety Data Sheet Creation Date: Dec. 12, 1997. Revision #2 Date: Mar. 18, 2003. Accessed Dec. 28, 2011.

Mazotti, M., et al., "Mineral Carbonation and Industrial Uses of Carbon Dioxide," Chapter 7 of Report Edited by Metz, B., et al., 2005, Intergovernmental Panel on Climate Change (online URL) http://www.ipcc.ch/pdf/special-reports/srccs/srccs_chapter7.pdf . p. 325. May 31, 2012.

PCT Search Report and Written Opinion, issued in International Application No. PCT/US2005/033814, dated Feb. 15, 2006.

PCT International Search Report and Written Opinion issued in International Application No. PCT/US2010/061111, dated Feb. 18, 2011.

*Proceedings of First National Conference on Carbon Sequestration*, May 14-17, 2001, Washington, DC. United States Department of Energy, National Energy Technology Laboratory. CD-ROM USDOE/NETL-2001/1144; also available at http://www.netl.doe.gov/publications/proceedings/01/carbon_seq/carbon_seq01.html.

Pulvirenti et al., "Acid generation upon thermal concentration of natural water: The critical ate content and the effects of ionic composition," *Journal of Contaminant Hydrology*, 109:62-81, 2009.

Search Report and Office Action issued in Taiwanese Patent Application No. 099137495, dated Apr. 25, 2013.

Search Report, issued by Georgian National Center of Intellectual Property "SAKPATENT", issued in Georgian Application No. AP 2005 009999, dated Jan. 8, 2010. (English Translation).

Search Report issued in Eurasian Patent Application No. 21290528, dated Mar. 18, 2013.

Shore et al., "V.F.1—Platinum Group Metal Recycling Technology Development," Department of Energy Hydrogen Program, United States. Department of Energy Fiscal Year 2008 Annual Progress Report, pp. 35-938. Published Nov. 2008. Available on the internet at http://www.hydrogen.energy.gov/pdfs/progress08/v_f_1_shore.pdf. Accessed Dec. 28, 2011.

"Skyonic Corporation presents the SkyMine Process—A proprietary technology that removes carbon dioxide ($CO_2$) and other flue gas pollutants—converting same into non-toxic, commercial chemicals," Presentation given to President's Council of Advisors on Science and Technology by Joe Jones and Steve Goldstein, on Sep. 20, 2005.

Sodium Iodide, Material Safety Data Sheet, CAS No. 7681-82-5, Chemical Book, available on the internet at http://www.chemicalbook.com/ProductMSDSDetailCB6170714_EN.htm. Copyright 2008. Accessed Dec. 28, 2011.

Spycher, N. et al., "CO2—H2O Mixtures in the Goeological Sequestration of CO2. II. Partitioning in Chloride Brines at 12-100C and up to 600 bar," Lawrence Berkeley National Laboratory (online URL) http://escholarship.org/uc/item/2z23v4zc . Sep. 13, 2004.

Wei, Xinchao, "Technological evaluation of mineral sequestration of $CO_2$ by carbonation," Thesis submitted to College of Engineering and Mineral Resources at West Virginia University in partial fulfillment of the requirements for the degree of Master of Science in Mining Engineering, 2003.

Extended European Search Report issued in Application No. 15737368, dated Jul. 12, 2017.

\* cited by examiner

| Run | Composition of Feed Gas | Vol of Bleach (gallons) | Strength of Bleach | Vol of Bicarb Solution (gallon) | Conc of Bicarb Solution % NaHCO3/ % Na2CO3 | Instrument (GC/Testo) | Gas Flow (SCFM) | Column Diameter (inches) |
|---|---|---|---|---|---|---|---|---|
| 1 | Air | 3 | 10% | 3 | 8.11%/4.82% | Testo | 3 | 6 |
| 2 | Flue Gas | 3 | 10% | 3 | 8.11%/4.82% | Testo | 2.114 | 6 |
| 3 | Air & NO | 3 | 10% | 3 | 8.22%/4.54% | Testo | 3.24 | 6 |
| 4 | Air, CO$_2$, & NO | 3 | 10% | 3 | 8.22%/4.54% | Testo | 2.16 | 6 |
| 5 | N2, CO2, SO2, NO | 0.462 | 8.25% | 0.462 | 6.24% | GC | 0.08 | 4 |
| 6 | Air, CO2, SO2, NO | 0.462 | 8.25% | 0.462 | 6.25% | GC | 0.08 | 4 |
| 7 | Air, CO2, SO2, NO | 0.462 | 8.25% | 0.462 | 8.22%/4.54% | GC | 0.08 | 4 |
| 8 | Air, CO2, SO2, NO | 0.462 | 8.25% | 0.462 | 6.25% | GC | 0.08 | 4 |

FIG. 4a

| Run | CO₂ In (%) | CO₂ Out (%) | % CO2 reduction | NO In (ppm) | NO Out (ppm) | % Reduction NO | NO2 In (ppm) | NO2 Out (ppm) | % Reduction NO2 | SO₂ In (ppm) | SO₂ Out (ppm) | % Reduction SO₂ |
|---|---|---|---|---|---|---|---|---|---|---|---|---|
| 1 | 0.1775 | 0.245 | Increase | 299.25 | 33.25 | 89% | n/a | n/a | n/a | 734.75 | 33 | 95% |
| 2 | 8.578 | 0.296 | 96.5% | 270.8 | 17.4 | 94% | n/a | n/a | n/a | 1043.6 | 24.4 | 98% |
| 3 | N/A | N/A | N/A | 263.2 | 39.6 | 85% | 12 | 0.96 | 88% | n/a | n/a | n/a |
| 4 | 27.3 | 2.43 | 91% | 299.4 | 21 | 93% | 7.68 | 0 | 100% | n/a | n/a | n/a |
| 5 | 12.96 | 12.69 | 2.10% | 431.94 | 331.71 | 23% | 54.67 | 0 | 100% | 540.31 | 0 | 100% |
| 6 | 14.19 | 13.8 | 2.78% | 214 | 81.67 | 61% | 0 | 0 | n/a | 597.89 | 3.17 | 99.50% |
| 7 | 16.99 | 14.63 | 13.89% | 182.49 | 135.83 | 28% | 0 | 0 | n/a | 476.55 | 0 | 100% |
| 8 | 17.03 | 16.86 | 1% | 212 | 187 | 11% | 0 | 0 | n/a | 585 | 0 | 100% |

FIG. 4b

SYSTEMS AND METHODS FOR ACID GAS REMOVAL FROM A GASEOUS STREAM

CROSS REFERENCE TO RELATED APPLICATIONS

This application claims priority to U.S. Provisional Application No. 61/928,965 filed Jan. 17, 2014. The entire text the above-referenced disclosure is specifically incorporated herein by reference without disclaimer.

BACKGROUND

A. Field of the Invention

The present invention generally relates to the field of removing acid gases from a gas stream. More particularly, the present invention relates to removing $H_2S$, $NO_x$, $SO_x$, and other pollutants from gas streams through the absorption of the acid gases from concentrated gas streams and then the separate generation of useful by-products comprising carbonate, bicarbonate, nitrate, and/or sulfate.

B. Description of Related Art

Most of the energy used in the world today is derived from the combustion of carbon and hydrogen containing fuels such as coal, oil, and natural gas. In addition to carbon and hydrogen, these fuels can contain oxygen, moisture, and contaminants such as $H_2S$, other sulfur-containing compounds that form $SO_x$ during combustion, nitrogen-containing compounds that form $NO_x$ during combustion, carbon dioxide, mercury, and other trace elements. Awareness to the damaging effects of the acid gas contaminants released during combustion, or present in the uncombusted fuel, triggers the enforcement of ever more stringent limits on emissions from power plants, refineries, and other industrial processes. Thus, pressures by regulators and the marketplace are increasing to achieve near zero emission of acid gas contaminants and to reduce $CO_2$ emission.

Amine processes already exist, which can non-selectively remove $CO_2$ and $H_2S$ from streams of flue gas. Nearly all amine processes seek to regenerate the amine, essentially using them as a catalyst; one commonly used in scrubbing $CO_2$ and $H_2S$ from natural gas is diethanolamine (DEA). One of the downsides of many amine processes is that they suffer problems with formation of contaminants in the form of Heat Stable Amine Salts (HSAS), which reduce the efficiency of scrubbing in the system via the formation of salts of chloride, sulfate, formate, acetate, oxalate, cyanide, thiocyanide, and thiosulfate. Other issues amine systems commonly run into include injection chemicals concentrating in the amine system, hydrocarbons condensing in the system, and (insoluble) particulates or suspended solids building up in the amine system. A wide range of amine-based systems exist under different brand names, but most suffer from the problems listed above to some degree.

Removal of acid gases such as $H_2S$ and $CO_2$ are necessary to comply with government regulation, and doing so more efficiently and at a lower capital cost is desired.

SUMMARY

Embodiments of the present disclosure relate to devices, systems, and methods to remove sulfur-based and/or nitrogen-based acid gases from a gas stream with a proprietary aqueous mixture of bleach (NaClO) at concentrations from 0.01% to 12% and sodium bicarbonate ($NaHCO_3$) at concentrations from 0.01% to 12%. The system is able to target acid gases, such as $H_2S$, while allowing organics, such as methane ($CH_4$) and ethane ($C_2H_6$) to pass through unreacted. With such systems, for example, a natural gas stream containing acid gas pollutants can be cleaned via the installation of this scrubbing system at a natural gas refinery, power plant, or other process plant.

Embodiments of the present disclosure relate to devices, systems, and methods to remove sulfur-based and/or nitrogen-based acid gases in an absorption column. A bicarbonate/carbonate stream generated in a different portion of the process can be directed to the absorption column and utilized as a reagent to sequester the sulfur-based and nitrogen-based acid gases. Such embodiments can further comprise a chlor-alkali cell for generating hydroxide reagent that can be directly utilized in the sequestration of $CO_2$ and indirectly utilized (by reacting it with $Cl_2$ to produce a hypochlorite) in the sequestration of sulfur-based and nitrogen-based acid gases.

One aspect of the disclosure relates to a system for effectively reducing pollutants from a gas stream comprising: a first set of mixing equipment adapted to admix a hydroxide with a gas stream to create a first admixture in which carbon dioxide and/or carbon monoxide in the gas stream can react with a hydroxide to produce a bicarbonate product or a combination of bicarbonate and carbonate products in a first liquid outflow and a second set of mixing equipment adapted admix a hypochlorite and the bicarbonate product or the combination of bicarbonate and carbonate products with the gas stream to create a second admixture in which nitrogen-based or sulfur-based acid gases can react with the hypochlorite and the bicarbonate product or the combination of bicarbonate and carbonate products to produce nitrate or sulfate products in a second liquid outflow, wherein a gas stream flows through the second set of mixing equipment before at least a portion of the gas stream flows through the first set of mixing equipment.

Another aspect of the disclosure relates to a method of effectively reducing an amount of pollutants from a gas stream comprising (a) obtaining a hydroxide in an aqueous mixture; (b) obtaining a hypochlorite in an aqueous mixture; (c) admixing the hydroxide with carbon dioxide in the gas stream to produce bicarbonate products or a combination of carbonate and bicarbonate products in a first admixture, thereby sequestering the carbon dioxide in a mineral product form; and (d) admixing the hypochlorite and at least a portion of the bicarbonate products or a combination of carbonate and bicarbonate products from the first admixture with a sulfur-based or nitrogen-based acid gas in the gas stream to produce nitrate or sulfate product in a second admixture, thereby sequestering the acid gas.

Yet another aspect of the disclosure relates to a method of scrubbing natural gas stream, wherein the scrubbing phase consists of or consists essentially of admixing a hypochlorite oxidant and bicarbonate absorbent with a sulfur-based or nitrogen-based acid gas in the natural gas stream to produce nitrate or sulfate product in an admixture, thereby sequestering the acid gas.

As used herein, the phrase "gas stream" comprises a gas stream with at least one acid gas. Examples of a gas stream include a raw natural gas stream, and a waste gas stream, such as a flue-gas stream. Gas streams can be generated by a power generation process that uses combustion of carbon-based fuels, manufacturing process, industrial process, or a natural reservoir extraction process.

An acid gas can be carbon-, sulfur-, and/or nitrogen-based and can comprise $H_2S$, $SO_x$, $NO_x$, and $CO_2$. Nitrogen oxides ($NO_x$) comprise NO, $NO_2$, $N_2O_3$, $N_2O_5$, and associated dimers. Sulfur oxides ($SO_x$) comprise $SO_2$ and $SO_3$. Other acid gases that can be removed from described embodiments include HF and HCl.

As used herein, the terms "carbonates" or "carbonate products" are generally defined as mineral components containing the carbonate group $[CO_3]^{2-}$. Thus, the terms encompass both carbonate/bicarbonate mixtures and species containing solely the carbonate ion. The terms "bicarbonates" and "bicarbonate products" are generally defined as mineral components containing the bicarbonate group $[HCO_3]^{1-}$. Thus, the terms encompass both carbonate/bicarbonate mixtures and species containing solely the bicarbonate ion.

As used herein, the term "sequestration" is used to refer generally to techniques or practices whose partial or whole effect is to remove $CO_2$ from point emissions sources and to store that $CO_2$ in some form so as to prevent its return to the atmosphere. Use of this term does not exclude any form of the described embodiments from being considered "sequestration" techniques.

As used herein, the terms "low-voltage electrolysis" and "LVE" are used to refer to electrolysis at current densities below about 4 $kA/m^2$.

The term "coupled" is defined as connected, although not necessarily directly, and not necessarily mechanically. Two items are "couplable" if they can be coupled to each other, and, when coupled, may still be characterized as "couplable." Unless the context explicitly requires otherwise, items that are couplable are also decouplable, and vice-versa. One non-limiting way in which a first structure is couplable to a second structure is for the first structure to be configured to be coupled (or configured to be couplable) to the second structure.

The terms "a" and "an" are defined as one or more unless this disclosure explicitly requires otherwise. The term "another" is defined as at least a second or more. The terms "substantially" and "about" are defined as at least close to (and includes) a given value or state (preferably within 10% of, more preferably within 1% of, and most preferably within 0.1% of).

The terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent.

The term "effective," as that term is used in the specification and/or claims, means adequate to accomplish a desired, expected, or intended result.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, any of the present devices, systems, and methods that "comprises," "has," "includes" or "contains" one or more elements possesses those one or more elements, but is not limited to possessing only those one or more elements. Likewise, an element of a device, system, or method that "comprises," "has," "includes" or "contains" one or more features possesses those one or more features, but is not limited to possessing only those one or more features. Additionally, terms such as "first" and "second" are used only to differentiate structures or features, and not to limit the different structures or features to a particular order.

Furthermore, a structure that is capable of performing a function or that is configured in a certain way is capable or configured in at least that way, but may also be capable or configured in ways that are not listed.

The feature or features of one embodiment may be applied to other embodiments, even though not described or illustrated, unless expressly prohibited by this disclosure or the nature of the embodiments.

Any of the present devices, systems, and methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure may not be labeled in every figure in which that structure appears. Identical reference numbers do not necessarily indicate an identical structure. Rather, the same reference number may be used to indicate a similar feature or a feature with similar functionality, as may non-identical reference numbers.

FIGS. 4a and 4b show the study parameters and results, respectively, of a $NO_x$ removal study.

DETAILED DESCRIPTION

Figure 1:
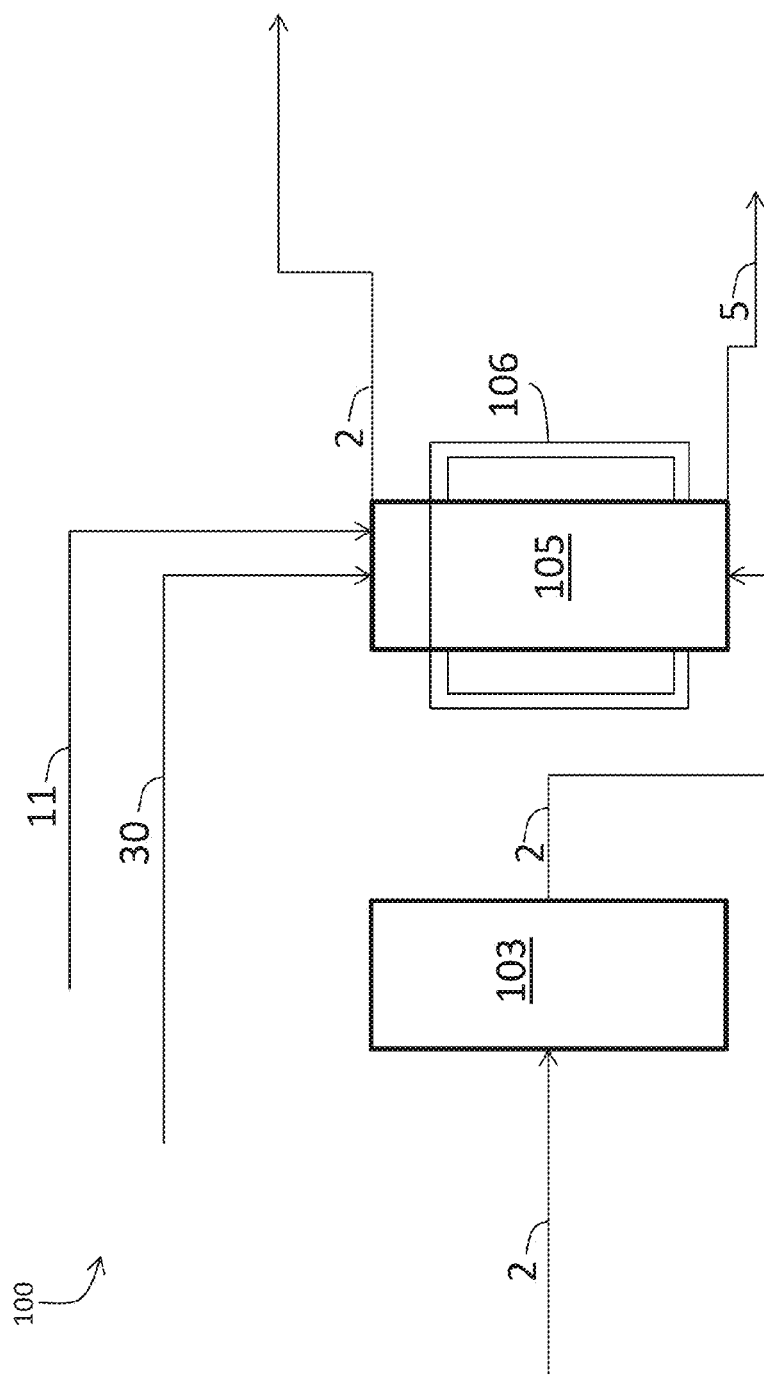
FIG. 1 is a process-flow diagram showing the primary features of one embodiment of the acid gas removal unit utilizing hypochlorite and bicarbonate.

The present invention relates to at least a two-stage absorption processes in which an acid gas or acid gases, such as $CO_2$, $H_2S$, $NO_x$, and/or $SO_x$, are removed from a gas stream and converted into a carbonate, a bicarbonate, a sulfate, or a nitrate. Embodiments of the methods and apparatuses of the present disclosure comprise one or more of the following general components: (1) an aqueous decarbonation process whereby gaseous $CO_2$ is absorbed into an aqueous caustic mixture and then reacted with a hydroxide to form carbonate and/or bicarbonate products; (2) a separation process whereby the carbonate and/or bicarbonate products are separated from the liquid mixture; (3) a brine electrolysis process for production of the sodium hydroxide that is used in the absorbent fluid in the decarbonation process; (4) an aqueous oxidization process whereby an acid gas is absorbed into the aqueous oxidizing mixture and then reacted with a hypochlorite and a bicarbonate to form a sulfate and/or nitrate product; (5) a separation process whereby the sulfate and/or nitrate products generated in the oxidation process are extracted from the aqueous mixture; (6) a hypochlorite generation process for production of the hypochlorite that is used as part of the aqueous oxidizing mixture; and (7) further processing or utilization of by-products from the decarbonation, oxidation, and electrolysis processes, including chlorine gas, hydrogen gas, hydrochloric acid, carbonate and bicarbonate, nitrates, sulfates, and bleach. Each of these general components is explained in further detail below.

While many embodiments of the present invention consume some energy to accomplish the absorption of acid gases from a gas stream and to accomplish the other objectives of embodiments of the present disclosure as described herein, one advantage of certain embodiments of the present disclosure is that they provide ecologic efficiencies that are superior to those of the prior art, while absorbing most or all of the acid gases, including at least one or any combination of $CO_2$, $H_2S$, $SO_x$, and $NO_x$.

Unlike other processes in the art, certain embodiments sequester carbon-dioxide and other acid gases into economically useful chemicals and co-incidentally produce useful by-products such as sodium carbonate, sodium bicarbonate, sodium hypochlorite, chlorine gas, hydrochloric acid, and hydrogen gas. Because the by-products of the described processes are economically useful, those values offset the costs of acid gas removal and, in properly designed systems, potentially make the sequestration process profitable in itself. Moreover, unlike other processes in the art, the sequestration of $CO_2$ generates byproducts that can be utilized to sequester other acid gases, also adding to the cost and ecological efficiency.

Another additional benefit of certain embodiments of the present disclosure that distinguishes them from other $CO_2$-removal processes is that in some market conditions, the products are worth considerably more than the reactants required or the net-power or plant-depreciation costs. In other words, certain embodiments are industrial methods of producing chlor-hydro-carbonate products as well as nitrate and/or sulfate products at a profit, while accomplishing considerable removal of acid gases.

I. Flow Diagram: Absorption of Acid Gases Utilizing Hypochlorite/Bicarbonate

FIG. 1 depicts a simplified process-flow diagram illustrating general, exemplary embodiments of the apparatuses and methods of the present disclosure. This diagram is offered for illustrative purposes only, and thus it merely depicts specific embodiments of the present disclosure and is not intended to limit the scope of the claims in any way.

In the embodiment shown in FIG. 1, the gas stream 2 to be scrubbed enters System 100 at a Hypochlorite/Bicarbonate Scrubber 105. Scrubber 105 is configured to remove (e.g., reduce the concentration of) acid gases comprising sulfur containing compounds and/or nitrogen containing compounds from gas stream 2, utilizing hypochlorite and bicarbonate as the reactants. The acid gases removed from gas stream 2 through such process can include at least one of $H_2S$, $NO_x$, $SO_x$, and combinations thereof. Examples of the possible chemical reactions occurring in Scrubber 105 include the following.

$H_2S$:

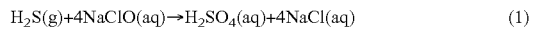

(1)

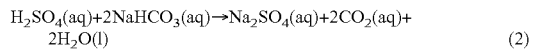

(2)

$SO_x$:

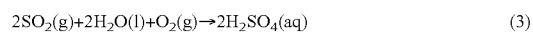

(3)

(4)

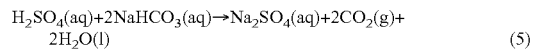

(5)

$NO_x$:

(6)

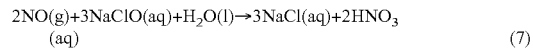

(7)

(8)

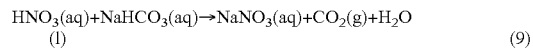

(9)

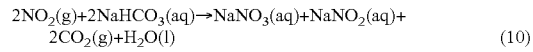

(10)

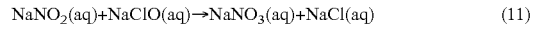

(11)

Scrubber 105 can be any wet scrubbing configuration suitable to bring the gas stream 2 into contact with the liquid phase containing hypochlorite and bicarbonate, so as to effectively reduce the amount of nitrogen and sulfur containing compounds present in gas stream 2. In the embodiment shown, the bicarbonate and hypochlorite reactants are delivered to Scrubber 105 separately, such as via lines 11 and 30, respectively. In various embodiments, Scrubber 105 can be a packed or unpacked bubble column. In the embodiment shown, Scrubber 105 comprises a set of downcomers 106 configured to create a recirculation loop to recirculate the liquid phase containing hypochlorite and bicarbonate. In some embodiments, System 100 can comprise two Scrubbers 105 and gas stream 2 can be selectively routed to either one or both. In some embodiments, the liquid phase in one of the Scrubbers 105 may be substantially replaced with fresh reactor solution, while gas stream 2 is passing through the other Scrubber 105. The nitrate, sulfate, and or bicarbonate products produced in Scrubber 105 can be transported for further processing or storage, such as via line 5.

In advance of entering Scrubber 105, if desired, gas stream 2 can be processed to remove any heavy metals, particulates, and residual water content, e.g., in Knockout Tank 103. Such processing may be needed when the gas stream is a natural gas or a flue gas stream. In various embodiments, Knockout Tank 103 can be configured to remove heavy metals, particulates by spraying a stream of a dilute hydroxide solution in Knockout Tank 103 that mixes with gas stream 2. The concentration of the hydroxide solution can be 0.5%, 1%, 1.5%, 2%, 2.5%, 3%, 3.5% by wt. or any value therebetween. A portion of the acid gases, particularly the sulfur-based acid gases, may also be removed in this process. In other embodiments, such as the one shown in FIG. 2 described below, Knockout Tank 103 can be located after the Scrubber 105 to remove residual sulfur-containing and nitrogen-containing acid gases in gas stream 2 prior to it entering into Columns 110/111 as described below.

II. Flow Diagram: Absorption of Carbon Dioxide and Other Acid Gases

Figure 2:
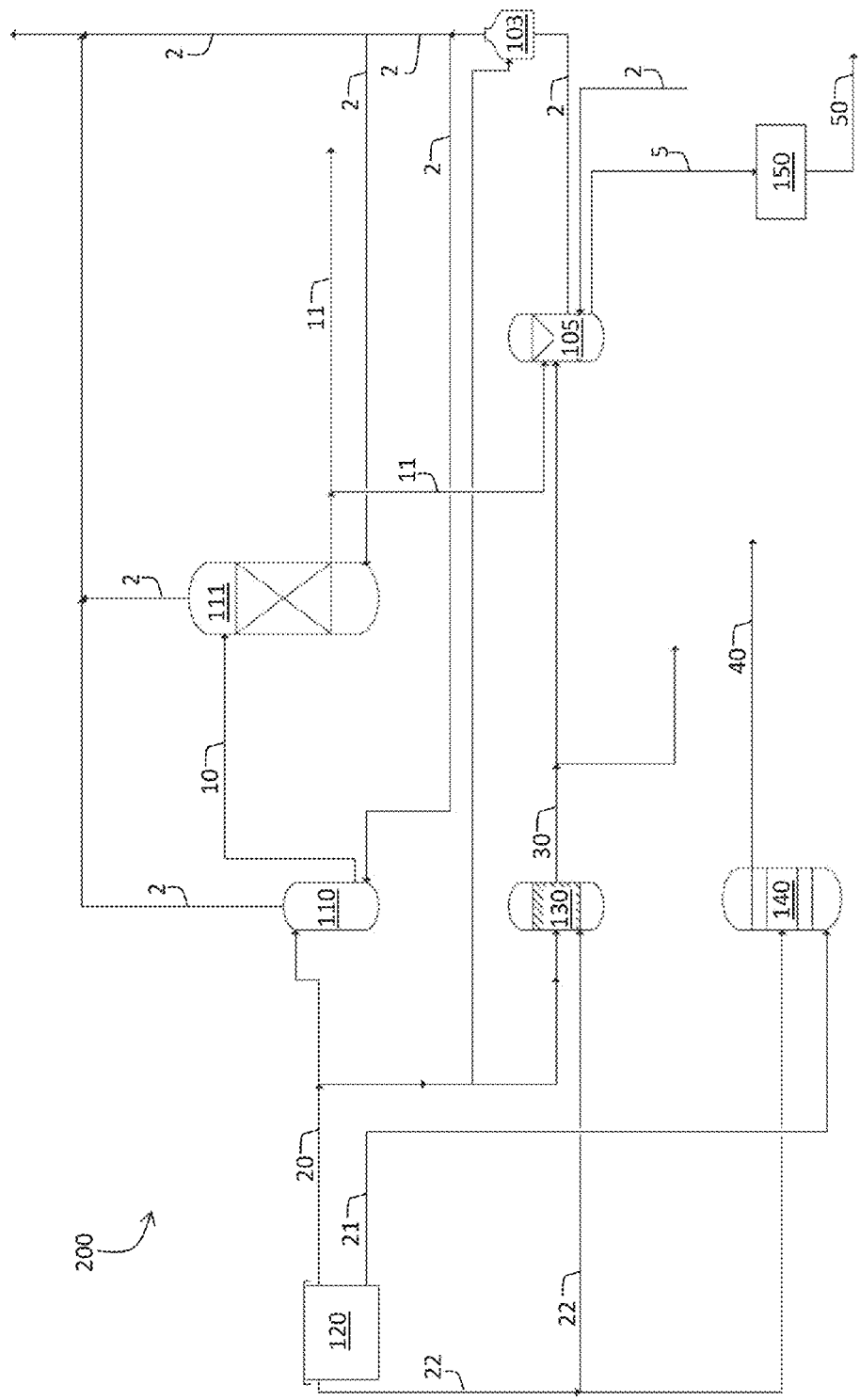
FIG. 2 is a process-flow diagram showing primary features of one embodiment of the acid gas removal unit having a first stage utilizing hypochlorite and bicarbonate and a second stage utilizing sodium hydroxide to make the bicarbonate. The process-flow diagram further shows how the units are integrated so that products of one unit can be the reactants for another unit(s).

FIG. 2 depicts a simplified process-flow diagram illustrating general, exemplary embodiments of the apparatuses and methods of the present disclosure. This diagram is offered for illustrative purposes only, and thus it merely depicts specific embodiments of the present invention and is not intended to limit the scope of the claims in any way.

In the embodiment shown in FIG. 2, the gas stream 2 to be scrubbed and decarbonated enters system 200 at a Hypochlorite/Bicarbonate Scrubber 105, such as the one described above. $CO_2$, which is a byproduct of this scrubbing process (see, e.g., equations (2), (5), (9), and (10)), becomes part of gas stream 2 exiting Scrubber 105. Thus, in various embodiments, exiting gas stream 2 can potentially comprise both $CO_2$ originally present in the gas stream and $CO_2$ byproduct generated by the process in Scrubber 105. In other embodiments, gas stream 2 may only comprise the $CO_2$ byproduct.

Gas stream 2 flowing from Scrubber 105 can be differentially introduced into Absorption/Carbonation Column 110 or Bubble/Bicarbonation Column 111, configured in series. In the depicted embodiment, hydroxide from Chlor-alkali Cell 120 can be transferred to Absorption/Carbonation Column 110, such as via line 20, to react with carbon dioxide present in the portion of gas stream 2 introduced into Absorption/Carbonation Column 110 according to the reaction represented by equation 12. In some embodiments, the concentration of the hydroxide solution generated in the Chlor-alkali Cell 120 can be diluted to a preferred concentration prior to introducing into the Chlor-alkali Cell 120.

$$2NaOH + CO_2 \rightarrow Na_2CO_3 + H_2O \qquad (12)$$

A portion of the liquid phase comprising sodium carbonate from Absorption/Carbonation Column 110 is transported, such as via line 10, to Bubble/Bicarbonation Column 111 to cause conversion of carbonate to bicarbonate by reaction with residual $CO_2$ in the liquid phase, as represented by equation 13. In the depicted embodiment, at least a portion of the bicarbonate generated in Column 111 is transported to Scrubber 105, such as via line 11, to be consumed, for example, according to reactions (2), (5), (9), and (10).

$$Na_2CO_3 + CO_2 + H_2O \rightarrow 2NaHCO_3 \qquad (13)$$

The process of decarbonation occurring in Absorption/Carbonation Column 110 and Bubble/Bicarbonation Column 111 can be further modified, optimized and scaled up using the principles and techniques of chemistry, chemical engineering, and/or materials science as applied by a person skilled in the art and taught, for example, in U.S. Pat. No. 7,727,374, which is hereby incorporated by reference in its entirety.

After passing through Scrubber 105 and one or both of Columns 110 and 111, the gas stream has significantly reduced levels of acid gases. Gas stream 2 can then proceed to the next step, which will depend on the specific application within which this described process is being utilized. For example, an industrial process gas stream may require further cleaning or be directly discharged into the atmosphere. In other embodiments, such as in the context of cleaning a natural gas stream, the gas stream can be transported for use at another location, utilized in power generation, or stored for later use.

Supporting processes and apparatuses are integrated into System 200 to generate additional reactants for the above-described absorption processes and include a Chlor-alkali Cell 120 and a Hypochlorite Reactor 130. Chor-alkali Cell 120 uses power to drive a reaction represented by equation 14.

$$2NaCl + 2H_2O \rightarrow 2NaOH + Cl_2 + H_2 \qquad (14)$$

The sodium hydroxide generated in Cell 120 can be delivered, such as via line 20, to either or both Absorption/Carbonation Column 110 and Hypochlorite Reactor 130. At least a portion of the chlorine, also from Chlor-alkali Cell 120, is delivered, such as via line 22, to either or both Hypochlorite Reactor 130 and HCl Burner 140.

In Hypochlorite Reactor 130, at least a portion of the chlorine is contacted with (e.g., bubbled through) at least a portion of the alkali hydroxide to produce a hypochlorite solution according to reaction 15. At least a portion of the hypochlorite solution can be fed into Scrubber 105, such as via line 30. The sodium hypochlorite not needed for Scrubber 105 can be trucked to market as salable bleach.

$$2NaOH + Cl_2 \rightarrow NaOCl + NaCl + H_2O. \qquad (15)$$

To capture the chlorine gas generated in the Chlor-alkali Cell 120 and not used in the Hypochlorite Reactor 130, the chlorine and hydrogen produced from the Chlor-alkali Cell 120 can be delivered to an HCl Burner 140, such as via lines 22 and 21, respectively to produce hydrogen chloride. The generated HCl can be transferred to a tank for storage or transport via line 40. The net reaction can be represented by equation 16:

$$Cl_2 + H_2 \rightarrow 2HCl \qquad (16)$$

In the embodiment shown, after Scrubber 105, gas stream 2 is processed to remove residual $SO_x$ and $NO_x$ acid gases, e.g., in Knockout Tank 103. For example, Knockout Tank 103 can be configured to absorb residual $SO_x$ and $NO_x$ by spraying a stream of a dilute hydroxide solution in Knockout Tank 103 that mixes with gas stream 2. The concentration of the dilute hydroxide stream can be 0.5%, 1%, 1.5%, 2%, 2.5%, 3%, 3.5% by wt. or any value therebetween. In the depicted embodiment, the hydroxide in the dilute hydroxide solution is generated in Chlor-Alkali Cell 120.

At least a portion of the reacted liquid phase from Scrubber 105 containing nitrates and/or sulfates, such as $NaNO_3$ and/or $NaSO_4$, can be transferred, such as via line 5, to Fertilizer Generating Unit 150. In Unit 150, the liquid phase from Scrubber 105 can be reacted with ammonia to generate ammonium sulfate and/or ammonium nitrate according to equations 17 and 18 provided below. The liquid/solid phase products of equations 17 and/18 can be transferred for further processing or storage, such as via line 50. Like System 100, System 200 can comprise two Scrubbers 105 and gas stream 2 can be selectively routed to either one or both. In some embodiments, dual Scrubbers 105 can facilitate transfer of the liquid phase to Unit 150 and replenishment of the absorption fluid.

Through the above-described process, the bicarbonate by-product generated from decarbonation can be utilized along with hypochlorite to scrub the gas stream of a variety of acid gases in Scrubber 105, and the generated $CO_2$ as a result of the scrubbing with the bicarbonate can be recaptured by the decarbonation process. In addition, many of the generated by-products can be sold for economic gain, such as, sodium hypochlorite and sodium bicarbonate. The sulfate and nitrate byproducts can be easily disposed of or can be further processed to generate fertilizer for economic gain.

These methods and devices can be further modified, optimized and scaled up using the principles and techniques of chemistry, chemical engineering, and/or materials science as applied by a person skilled in the art. Such principles and techniques are taught, for example, in U.S. Patent Application Publications 2006/0185985 and 2009/0127127, U.S. Pat. No. 7,727,374, filed Sep. 22, 2005, U.S. Provisional Patent Application No. 60/718,906, filed Sep. 20, 2005; U.S. Provisional Patent Application No. 60/642,698, filed Jan. 10, 2005; U.S. Provisional Patent Application No. 60/612,355, filed Sep. 23, 2004, U.S. patent application Ser. No. 12/235,482, filed Sep. 22, 2008, U.S. Provisional Application No. 60/973,948, filed Sep. 20, 2007, U.S. Provisional Application No. 61/032,802, filed Feb. 29, 2008, U.S. Provisional Application No. 61/033,298, filed Mar. 3, 2008, International Application No. PCT/US08/77122, filed Sep. 19, 2008, and U.S. Patent Publication No. 2013/0202516, filed Jan. 11, 2013. The entire text of each of the above-referenced disclosures (including any appendices) is specifically incorporated by reference herein without disclaimer.

The above examples were included to demonstrate particular embodiments of the invention. However, those of skill in the art should, in light of the present disclosure, appreciate that many changes can be made in the specific embodiments which are disclosed and still obtain a like or similar result without departing from the spirit and scope of the invention.

III. Aqueous Sequestration (Absorption) of Acid Gases from Gas Streams and its Conversion into Nitrates and/or Sulfates As noted above, in certain embodiments, the apparatuses and methods of the present disclosure employ an aqueous sequestration process whereby an acid gas is absorbed into an aqueous caustic mixture where it then reacts with the hypochlorite and bicarbonate to form sulfate and/or nitrate products. In embodiments of the present disclosure, sodium hypochlorite and sodium bicarbonate are used as the scrubbing reagents. When an acid gas is brought into contact with aqueous sodium hypochlorite and aqueous sodium bicarbonate, the resulting products depend on the composition of the gas stream. In general, the products include sodium nitrate ($NaNO_3$) and sodium sulfate ($Na_2SO_4$). In some embodiments of the present disclosure, most of the sulfur-based acid gases and nitrogen-based acid gases are reacted in this manner, e.g., at least 70%, 75%, 80%, 85%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, or 99.9% of the acid gases are reacted in this manner.

The process conditions and amount of reagents can be varied based on the composition of the gas stream, whether it only comprises sulfur-based acid gases, only nitrogen-based acid gases, or some combination thereof. Generally, the concentrations of sodium hypochlorite and sodium bicarbonate can each be between 0.1% to about 12% by weight, such as 0.6%, 0.7%, 0.8%, 0.9%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, or any value or range therebetween. For example, in certain embodiments, the sodium hypochlorite concentration is about 0.5% to about to about 6% by weight, to about 5% by weight, to about 4% by weight, or to about 3% by weight. Similarly, in certain embodiments, the sodium bicarbonate concentration is about 0.5% to about 8% by weight, to about 7% by weight, to about 6% by weight, to about 5% by weight, to about 4% by weight, or to about 3% by weight. In addition, in various embodiments, the molar ratio of hypochlorite to bicarbonate can be between about 5:1 to about 1:1, such as about 4:1, 3:1, or 2:1. For example, the molar ratio of hypochlorite to bicarbonate can be between about 2:1 to about 5:1 or to about 4:1. The pH of the liquid phase within Scrubber 105 can be neutral to basic, such as between a pH of about 7, 7.5, 8, 8.5, 9, 9.5, 10, 10.5, 11 or any value or range therebetween.

The formation of nitrate and/or sulfate products can occur over a wide range of temperatures and pressures. With respect to temperature, by way of example, the incoming gas can be between about 20° C. to about 140° C. and the incoming liquid reagent feed(s) can be between about 10° C. to about 100° C. Also, by way of example, the headspace pressure in the absorption column can be between about 1 atm to about 3 atm.

In various embodiments, Scrubber 105 can be a spray-tower, a packed or unpacked bubble column or a series thereof, or any other mixing configuration suitable to bring the absorbent solution(s) into effective contact with the gas stream.

Figure 3A:
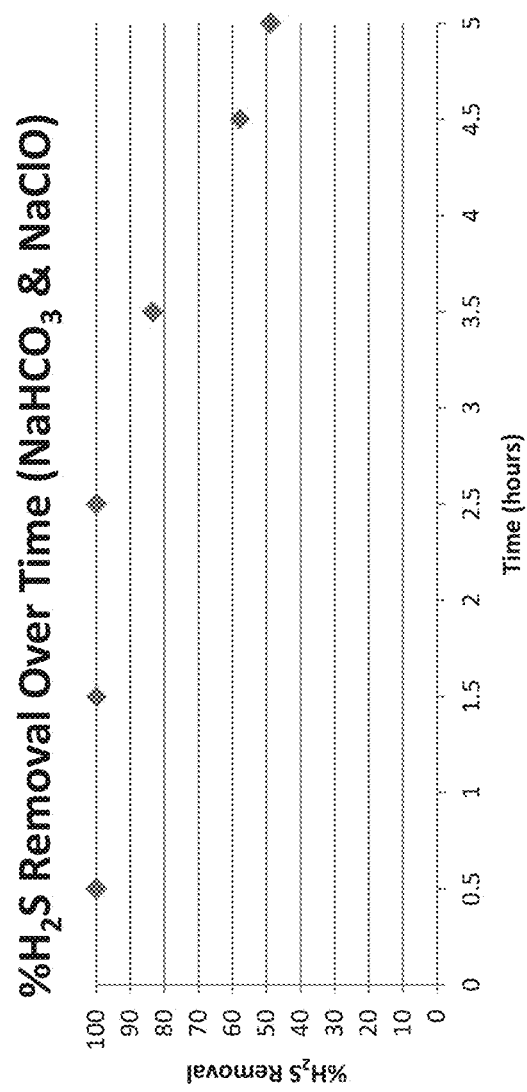
FIGS. 3a and 3b show the results of a $H_2S$ removal study, namely, a plot of the percentage of $H_2S$ removal over time and the temperature of the absorption liquid over time, respectively.
Figure 3B:
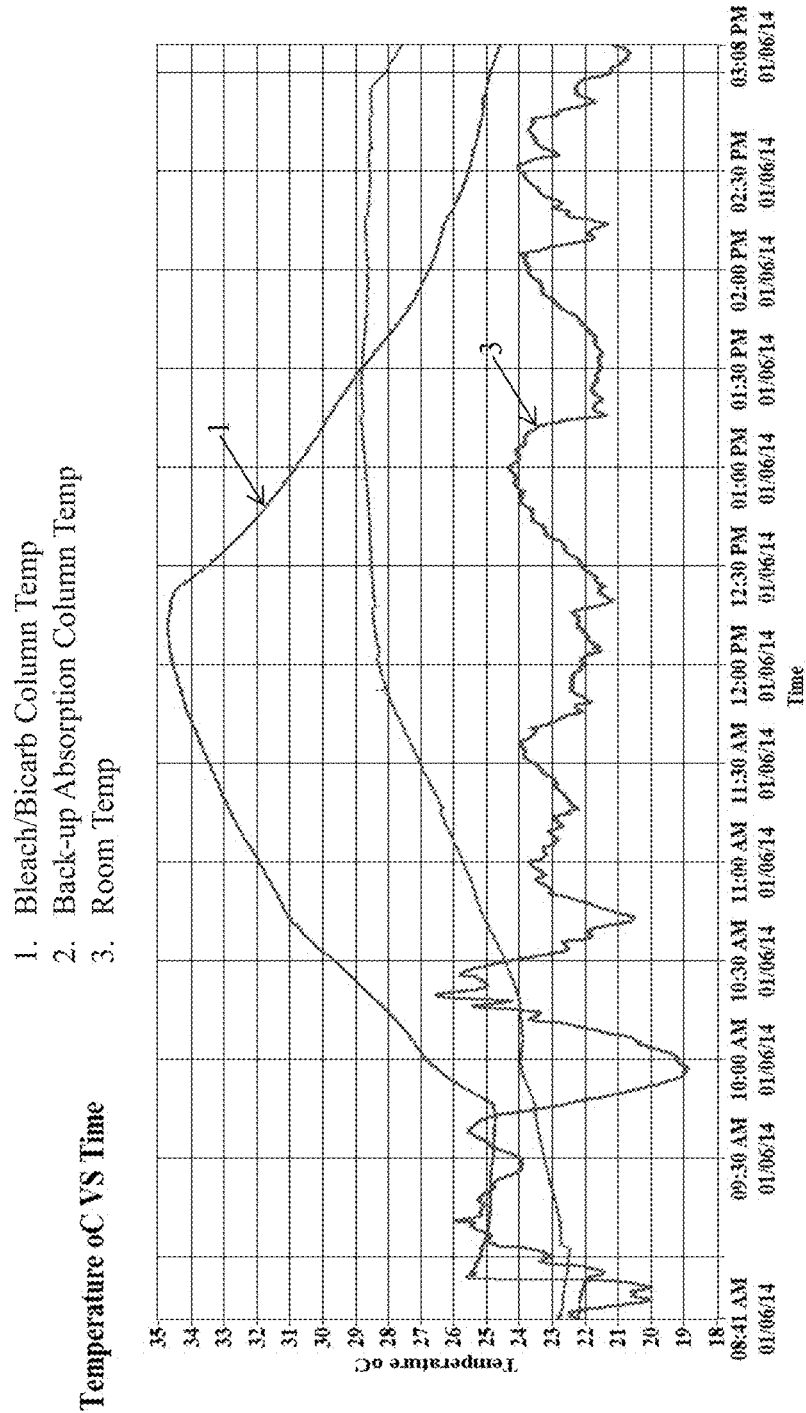

A bench scale study of sequestering $H_2S$ with a hypochlorite-bicarbonate solution was performed using a gaseous mixture of $H_2S$ and $CO_2$ and bubbling it through the solution. The results of the study demonstrate efficacy and provide insight into how the concentrations and relative ratios of hypochlorite and bicarbonate affect sequestration. The test parameters and results are shown in Tables 1 and 2 below. FIG. 3a plots the percent of $H_2S$ removal over time and FIG. 3b plot the temperature of the liquid phase. After 2.5 hours of run time, the percentage of $H_2S$ removed from the gas begins to decline as does the temperature. This is likely due to a diminished concentration of hypochlorite, as this data was generated on a test run in batch mode.

TABLE 1

| 4" Column Composition | |
| --- | --- |
| Compound | Quantity |
| $NaHCO_3$ | 251.98 g (6.38% wt) |
| NaClO (8.25%) | 1,946.67 (159.34) g (4.04% wt) |
| $H_2O$ | 1,748.65 g |

TABLE 2

| Run Results | | | | | |
| --- | --- | --- | --- | --- | --- |
| Sample | Time After Start | mol % $CO_2$ | mol % $N_2$ | mol % $H_2S$ | % $H_2S$ Removed |
| | | 10 | 0 | 5.52 | |
| 1 | 0:30 | 12.59 | 1.12 | 0.0037 | 99.93 |
| 2 | 1:30 | 18.74 | 0.62 | 0.0036 | 99.93 |
| 3 | 2:30 | 16.34 | 0.67 | 0.0029 | 99.95 |
| 4 | 3:30 | 13.48 | 2.02 | 0.92 | 83.41 |
| 5 | 4:30 | 12.07 | 0.29 | 2.33 | 57.83 |
| 6 | 5:00 | 11.95 | 0.91 | 2.82 | 48.84 |

A bench scale study of sequestering $NO_x$ with a hypochlorite-bicarbonate solution was also performed using various gaseous mixtures containing NO, $NO_2$, $SO_2$, and/or $CO_2$ and bubbling the gas mixture through the solution. The results of the study show that different combinations of gasses and different concentrations of hypochlorite and bicarbonate can greatly affect the overall reactivity of the NO molecule and that the specific composition of the reactor may be tailored to some extent by the composition of the gas stream that is being treated. The test parameters and results of the study are shown in the tables in FIGS. 4a and 4b, respectively. The results of the study demonstrate efficacy and provide insight into how the concentrations and relative ratios of hypochlorite and bicarbonate affect sequestration. The solutions with higher strength bleach and a higher gas flow tended to capture more NO, likely due to better contacting between the bleach and the NO.

While the described Scrubber 105 embodiments use sodium hypochlorite, those of ordinary skill will understand that it is possible to obtain similar chemistry and oxidation with any number of hypochlorites or mixtures thereof, including but not limited to potassium hypochlorite, calcium hypochlorite, and magnesium hypochlorite. Similarly, described embodiments also use sodium bicarbonate, yet those of ordinary skill will understand that it is possible to obtain similar chemistry and oxidation with any number of carbonates, bicarbonates or mixtures of carbonates and/or bicarbonates, including but not limited to sodium carbonate, sodium bicarbonate, potassium carbonate, potassium bicarbonate, calcium carbonate, calcium bicarbonate, magnesium carbonate, and magnesium bicarbonate.

IV. Aqueous Decarbonation (Absorption) of $CO_2$ from Gas Streams and its Conversion into Carbonate and Bicarbonate As noted above, in certain embodiments, the apparatuses and methods of the present disclosure employ an aqueous decarbonation process via Absorption/Carbonation Column 110 and Bubble/Bicarbonation Column 111, whereby gaseous $CO_2$ is absorbed into an aqueous caustic mixture where it then reacts with the hydroxide to form carbonate and bicarbonate products. In many embodiments of the present disclosure, sodium hydroxide is used as the primary absorbent fluid. Sodium hydroxide, in various concentrations, is known to readily scrub $CO_2$. When carbon dioxide is brought into contact with aqueous sodium hydroxide, a range of products from pure sodium bicarbonate ($NaHCO_3$) to pure sodium carbonate ($Na_2CO_3$) can be formed, and differing conditions can be produced that will drive the equilibrium in either direction. In some embodiments of the present disclosure, most or nearly all of the carbon dioxide is reacted in this manner. In some embodiments, the reaction may proceed to completion (or its near vicinity) and sufficient concentration of the desired carbonate product may be achieved (by either process chemistry or removal of water by various means) in order to cause precipitation of bicarbonate, carbonate, or a mixture of both.

In some embodiments, when carbon dioxide is brought into contact with aqueous sodium hydroxide, the fluid within the reaction columns approximates the behavior shown in equation 13. The two reaction process that take place are:

1. An initial absorption phase in which $CO_2$ is readily absorbed: As $CO_2$ enters the liquid, it absorbs into the fluid to form carbonic acid, which then reacts with hydroxide. The absorption ability of the fluid declines as the OFF concentration declines, and absorption ends and in some instances reverses when the OFF concentration is consumed. The reaction, shown in equation 12 above, is exothermic during this portion and forms almost exclusively carbonate.
2. A secondary conversion phase in which $CO_2$ is absorbed, but less favorably than the previous step. As $CO_2$ enters the liquid, it forms carbonic acid. This carbonic acid then reacts with the entering carbonate solution, forming a sodium bicarbonate solution by the following net stoichiometry:

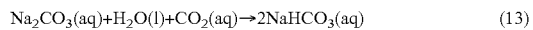
$$Na_2CO_3(aq) + H_2O(l) + CO_2(aq) \rightarrow 2NaHCO_3(aq) \qquad (13)$$

In various embodiments, as illustrated in FIG. 2, the formation of bicarbonate occurs in two separate columns, with one column being used to produce sodium carbonate and the other chamber being used to produce sodium bicarbonate. In various embodiments, each chamber can be a spray-tower, a packed or unpacked bubble column or a series thereof, or any other mixing configuration suitable to bring the hydroxide solution or carbonate solution in effective contact with the gas stream for absorption to carbonate in the case of Column 110 and conversion to bicarbonate in the case of Column 111.

In various embodiments of the present disclosure, a broad range in the amount of bicarbonate/carbonate/caustic/ bleach/other desirable products may be produced in the overall system. However, the amount of bicarbonate required for scrubbing acid gases is dependent on the composition of the gas stream. In certain embodiments, higher concentrations of sulfur-based and/or nitrogen-based acid gases can require more sodium bicarbonate to be directed to Scrubber 105, and conversely, lower concentrations require less.

These methods and devices can be further modified, optimized and scaled up using the principles and techniques of chemistry, chemical engineering, and/or materials science as applied by a person skilled in the art. Such principles and techniques are taught, for example, in U.S. Pat. No. 7,727,374, filed Sep. 22, 2005, U.S. Provisional Patent Application No. 60/718,906, filed Sep. 20, 2005; U.S. Provisional Patent Application No. 60/642,698, filed Jan. 10, 2005; U.S. Provisional Patent Application No. 60/612,355, filed Sep. 23, 2004, U.S. patent application Ser. No. 12/235,482, filed Sep. 22, 2008, U.S. Provisional Application No. 60/973,948, filed Sep. 20, 2007, U.S. Provisional Application No. 61/032,802, filed Feb. 29, 2008, U.S. Provisional Application No. 61/033,298, filed Mar. 3, 2008, International Application No. PCT/US08/77122, filed Sep. 19, 2008, and U.S. Patent Publication No. 2013/0202516, filed Jan. 11, 2013. The entire text of each of the above-referenced disclosures (including any appendices) is specifically incorporated by reference herein without disclaimer.

V. Separation of Products

With regard to the Column 110 and/or 111 liquid stream, the formation of sodium hydrogen carbonate ($NaHCO_3$ or sodium bicarbonate) and sodium carbonate ($Na_2CO_3$ or soda ash) occurs over a wide range of temperatures and pressures and provides different end-points of the equilibrium given different partial pressures of $CO_2$. By manipulating one or more of the basic concentration, reagent and/or gas flow rates, temperature, pressure, and fluid depth, formation of carbonate and/or bicarbonate precipitants may occur. In various embodiments, the reagent flow rates and/or the gas flow rates can be altered to cause the formation of carbonate and/or bicarbonate precipitants. Moreover, carbonate/bicarbonate precipitants may be separated from the liquid phase or dried by mechanical separation (e.g., a centrifuge) and/or the exchange of heat energy with incoming gases, in some embodiments. Alternatively or in addition thereto, in certain embodiments the heat for the separation process may be derived from the hydrogen produced in the original electrolysis.

The exiting liquid stream from the Column 110 and/or 111, depending upon absorber/system design, may include water, $NaHCO_3$, $Na_2CO_3$, and other dissolved gases in various equilibria. In one embodiment, to separate/remove the exiting liquid streams, e.g., removing/separating the water from the carbonates (in this sense of the word, "carbonates" means mixtures of carbonate and bicarbonate) may include mechanical separation (such as centrifuge separation) and/or adding heat energy to evaporate water from the mixture. In other embodiments, pure carbonate, pure bicarbonate, and mixtures of the two in equilibrium concentrations and/or in a slurry or concentrated form may then be periodically transported to storage tanks and/or trucks/tankcars. In other embodiments, the liquid streams may be displaced to evaporation tanks/fields, where the liquid, such as water, may be carried off by evaporation.

In a precipitation method according to certain embodiments of the present disclosure, the water in the liquid phase binds carbon dioxide, causing the gas to be absorbed on contact, with a substantially instantaneous conversion to carbonate ion. This phase of the reaction chain may be mass-transport limited such that once the carbon-dioxide has been absorbed, the subsequent ionic reaction occurs at rapid pace. However, for the formation of bicarbonate, the reaction is reaction rate limited. Therefore, a system that separates these two phases as described herein can be more efficient, particularly for obtaining higher purity precipitants.

With regard to Scrubber 105 liquid stream, the composition of the exiting liquid stream from Scrubber 105 largely depends on the contents of the gas stream. The exiting liquid stream may include water, $Na_2SO_4$, $NaNO_3$, NaCl, NaOCl, $NaHCO_3$, and other dissolved gases in various equilibria.

In one embodiment, to separate/dispose of the exiting liquid streams, e.g., removing/separating the water from the nitrates and sulfates, can involve heating the liquid to evaporate the water. In another embodiment, the sulfate can be isolated by passing the liquid stream through a sulfate recovery process that separates sulfates from NaCl and then add $CaCl_2$ to convert the $Na_2SO_4$ to $CaSO_4$, which precipitates. Similarly, in other embodiments, the aqueous phase can be reacted with ammonia to generate ammonium sulfate and/or ammonium nitrate according to equations 17 and 18, such as in Fertilizer Generating Unit 150. In this manner, bicarbonate can be regenerated. In addition, the ammonium sulfate and/or ammonium nitrate products can be utilized as a fertilizer.

$$Na_2SO_4(aq)+2NH_3(aq)+2H_2O(l)+2CO_2(g) \rightarrow (NH_4)_2SO_4(aq)+2NaHCO_3(s) \qquad (17)$$

$$NaNO_3(aq)+NH_3(aq)+H_2O(l)+CO_2(g) \rightarrow NH_4NO_3(aq)+NaHCO_3(s) \qquad (18)$$

In other embodiments, the liquid streams may be displaced to evaporation tanks/fields, where the liquid, such as water, may be carried off by evaporation.

VI. Electrolysis for the Production of Absorbent Fluids at Low Energies

As noted above, in certain embodiments, the apparatuses and methods of the present disclosure employ a Chlor-alkali Cell 120 for production of the sodium hydroxide that is used as the absorbent fluid in the decarbonation process. Chlor-alkali electrolysis is an electrochemical process primarily used in the production of concentrated sodium hydroxide (caustic soda) and chlorine gas, and is typically described throughout the relevant literature by equation 14:

$$2NaCl+2H_2O \rightarrow 2NaOH+H_2+Cl_2 \qquad (14)$$

Such electrolysis is typically accomplished by three general types of standard electrolysis cells: diaphragm, mercury, and membrane cells. Each of these types of cells produces the same output products from the same input reactants. They differ from each other primarily in the way the reactants and products are separated from each other.

In one embodiment, a membrane cell may be used due to several factors. First, environmental concerns over mercury have reduced the demand for the mercury cell. Second, the diaphragm cells may produce a relatively weak caustic product which contains significant concentrations of salt and chloride ion and requires considerable subsequent reprocessing/separation to remove the significant salt content from the caustic. Third, improvements in fluorinated polymer technology have increased the life-time and electrical efficiency of membrane cell technology, where membrane lifetimes in excess of five years are routinely guaranteed in the industrial markets. Further, the power-per-ton-of-caustic efficiencies exceed those of both diaphragm and mercury cells in preferred implementations.

Many preferred embodiments may employ membrane cells in this function. Membrane cells have several advantages over other chlor-alkali electrolysis processes. First, membrane cells neither contain nor produce any environmentally sensitive emissions (e.g., mercury) and are electrically efficient when compared with diaphragm and mercury cells. They also employ a concentrated/dilute/make-up NaCl loop such that they may be well-suited for use as a continuous "salt loop" processing unit. Next, NaOH produced in membrane cells without further evaporation/concentration may be a naturally appropriate level of concentration for use in a decarbonation process (e.g., 30-33% NaOH by weight). Membrane cell technology may also be easily scaled from laboratory to plant-size production by the addition of small incremental units.

Further, hydrogen produced by membrane cells is "clean," approximately "electronic grade," and relatively clear of NaCl or other contamination. As such, hydrogen may be compressed and tanked off as electronic-grade $H_2$ gas, used for power-production on-site such as combustion mix with low-grade coal or for combustion-technology gains. Alternatively, the hydrogen may be used for a boiler fuel for the separation processes. Additionally, chlorine gas produced by the membrane process is less "wet" than that produced by other standard electrolytic processes. As such, a one-stage compression cycle may be sufficient for production of water-treatment grade chlorine.

In certain embodiments, acid is added to the solution before it is electrolyzed. The acid can be any form of acid that can provide protonation to the solution, including but not limited to hydrochloric acid. Those of ordinary skill will understand that it is possible to obtain similar chemistry and electrolysis with any number of acids or mixtures of acids. In some embodiments, the acid is hydrochloric acid generated in Burner 140 through the combustion of byproducts, $H_2$ and $Cl_2$. The amount of acid added to the solution can be based on a determination of the optimum protonation rate that achieves the lowest energy to produce reactants and the highest energy to recover from products.

These methods and devices can be further modified, optimized and scaled up using the principles and techniques of chemistry, chemical engineering, and/or materials science as applied by a person skilled in the art. Such principles and techniques, including techniques for using low-voltage electrolysis (LVE) to improve the thermodynamic efficiency of the process, are taught, for example, in U.S. Pat. No. 7,727,374, filed Sep. 22, 2005, U.S. Provisional Patent Application No. 60/718,906, filed Sep. 20, 2005; U.S. Provisional Patent Application No. 60/642,698, filed Jan. 10, 2005; U.S. Provisional Patent Application No. 60/612,355, filed Sep. 23, 2004, U.S. patent application Ser. No. 12/235, 482, filed Sep. 22, 2008, U.S. Provisional Application No. 60/973,948, filed Sep. 20, 2007, U.S. Provisional Application No. 61/032,802, filed Feb. 29, 2008, U.S. Provisional Application No. 61/033,298, filed Mar. 3, 2008, International Application No. PCT/US08/77122, filed Sep. 19, 2008, and U.S. Patent Publication No. 2013/0202516, filed Jan. 11, 2013. The entire text of each of the above-referenced disclosures (including any appendices) is specifically incorporated by reference herein without disclaimer.

VII. Production of Hypochlorite

As noted above, in certain embodiments, the apparatuses and methods of the present disclosure employ a Hypochlorite Reactor 130. Chlorine gas generated in the chlor-alkali process in Cell 120 is collected and moved to Hypochlorite Reactor 130 and/or HCl Burner 140. The chlorine gas delivered to Hypochlorite Reactor 130 is contacted (bubbled) through a sodium hydroxide solution delivered directly or indirectly from Chlor-alkali Cell 120. Sodium hypochlorite solution results and can be used as the absorbent solution, along with a bicarbonate solution generated in Conversion/Bicarbonation Column 111, in Scrubber 105 and/or trucked to market.

VIII. Recovery of Waste-Heat

Because certain embodiments of the present disclosure are employed in the presence of a power-plant or large emission of $CO_2$ in the form of flue-gas or other hot gases from combustion, there may be ample opportunity to utilize this 'waste' heat in the optimization of the electro-chemical cell, unlike standard chlor-alkali processes. For instance, a typical incoming flue-gas temperature (after electro-static precipitation treatment, for instance) might well be 300° C. A system in accordance with the present disclosure can comprise heat exchangers adapted to lower that flue-gas to a point less than 300° C., while warming the anolyte and catholyte fluids (which, for LVE, should generally be retained >87.5° C.). This facilitates operation without the power-losses associated with anolyte and catholyte heaters.

Generally, since the flue-gas available at power-plant exits at temperatures between 100° C. (scrubbed typical), 300° C. (after precipitation processing), and 900° C. (precipitation entrance), or other such temperatures, considerable waste-heat processing can be extracted by cooling the incoming flue-gas through heat-exchange with a power-recovery cycle, of which an example is an ammonia-water cycle ("Kalina" cycle, for example), a steam cycle, or any such cycle that accomplishes the same thermodynamic means. Since some embodiments of the present disclosure rely upon DC power to accomplish the manufacture of the reagent/absorbent for the present disclosure, the process can be directly powered, partially or wholly, by waste-heat recovery that is accomplished without the normal transformer losses associated with converting that DC power to AC power for other uses. Further, through the use of waste-heat-to-work engines, significant efficiencies can be accomplished without an electricity generation step being employed at all. In some conditions, these waste-heat recovery energy quantities may be found to entirely power embodiments of the present disclosure.

Waste-heat recovery from other processes of the systems may also be employed similarly to gain efficiencies at other points in the system.

The above specifications and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this disclosure. As such, the illustrative embodiments of the present apparatuses, systems, and methods are not intended to be limiting. Rather, the present devices, systems, and methods include all modifications and alternatives falling within the scope of the claims, and embodiments other than those shown may include some or all of the features of the depicted embodiments. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not to be interpreted as including means-plus- or step-plus-function limitations, unless such a limitation is explicitly recited in a given claim using the phrase(s) "means for" or "step for," respectively.

The invention claimed is:

1. A system for effectively reducing pollutants from a gas stream comprising:
a first set of mixing equipment adapted to admix a hydroxide with the gas stream to create a first admixture in which carbon dioxide in the gas stream can react with a hydroxide to produce a bicarbonate product or a combination of bicarbonate and carbonate products in a first liquid outflow and
a second set of mixing equipment adapted to admix a hypochlorite and the bicarbonate product or the combination of bicarbonate and carbonate products with the gas stream to create a second admixture in which nitrogen-based or sulfur-based acid gases can react with the hypochlorite and the bicarbonate product or the combination of bicarbonate and carbonate products to produce nitrate or sulfate products in a second liquid outflow,
wherein the gas stream flows through the second set of mixing equipment before at least a portion of the gas stream flows through the first set of mixing equipment.

2. The system of claim 1, further comprising a conduit adapted to transfer the liquid outflow to the second set of mixing equipment to create the second admixture.

3. The system of claim 1, further comprising a chlor-alkali cell adapted to electrochemically produce the hydroxide with a protonated brine solution, wherein the chlor-alkali cell is in fluid communication with the first set of mixing equipment.

4. The system of claim 3, further comprising a third set of mixing equipment adapted to admix hydroxide from the chlor-alkali cell with chlorine gas from the chlor-alkali cell, wherein the chlor-alkali cell is in fluid communication with the third set of mixing equipment and wherein the third set of mixing equipment is in fluid communication with the second set of mixing equipment.

5. The system of claim 4, wherein at least a portion of the hydrochloric acid is in communication with the chlor-alkali cell to protonate a brine solution.

6. The system of claim 3, further comprising a fourth set of mixing equipment adapted to admix hydroxide from the chlor-alkali cell with the gas stream before at least a portion of the gas stream flows through the first set of mixing equipment.

7. The system of claim 3, further comprising a burner adapted to combust hydrogen gas and chlorine gas from the chlor-alkali cell to produce hydrochloric acid.

8. The system of claim 1, wherein the acid gases are selected from $NO_x$, $SO_x$, $SO_x$ and $H_2S$.

9. The system of claim 8, further comprising a fifth set of mixing equipment adapted to convert the sulfate or nitrate products to ammonium sulfate or ammonium nitrate.

10. The system of claim 1, wherein the acid gases are selected from $SO_x$ and $H_2S$.

11. The system of claim 10, further comprising a fifth set of mixing equipment adapted to separate the sulfate products from the second liquid outflow and form calcium sulfate in solid form.

12. The system of claim 1, wherein the second admixture comprises about 0.5% by weight to about 5% by weight of hypochlorite and about 0.5% by weight to about 5% by weight of bicarbonate.

13. The system of claim 12, wherein the molar ratio of hypochlorite to bicarbonate is about 1:1 to about 5:1.

14. The system of claim 1, wherein the first set of mixing equipment comprises two phases:
   a first phase adapted to admix the hydroxide with a portion of the gas stream exiting the second set of mixing equipment to produce carbonate products in a first phase liquid outflow and
   a second phase adapted to admix the first phase liquid outflow with another portion of the gas stream exiting the second set of mixing equipment to produce bicarbonate products in the first liquid outflow.

15. The system of claim 1, wherein the hypochlorite is in the form of sodium hypochlorite and the hydroxide is in the form of sodium hydroxide.

* * * * *